United States Patent
Campau

(10) Patent No.: US 6,311,727 B1
(45) Date of Patent: Nov. 6, 2001

(54) DIVERTER VALVE

(75) Inventor: Daniel N. Campau, Grand Rapids, MI (US)

(73) Assignee: Flow-Rite Controls, Ltd., Grand Rapids, MI (US)

( * ) Notice: Subject to any disclaimer, the term of this patent is extended or adjusted under 35 U.S.C. 154(b) by 0 days.

(21) Appl. No.: 09/676,218

(22) Filed: Sep. 29, 2000

(51) Int. Cl.$^7$ ....................................................... F16K 8/00

(52) U.S. Cl. ...................................... 137/625.48; 137/874

(58) Field of Search ................................ 137/874, 625.48

(56) References Cited

U.S. PATENT DOCUMENTS

| | | | | |
|---|---|---|---|---|
| 4,748,765 | * | 6/1988 | Martin | 43/55 |
| 5,010,836 | * | 4/1991 | Riviezzo | 114/255 |
| 5,236,175 | * | 8/1993 | Campau | 251/304 |

OTHER PUBLICATIONS

Flow–Rite Systems 5—Pump Out.

* cited by examiner

*Primary Examiner*—John Fox
(74) *Attorney, Agent, or Firm*—Niro, Scavone, Haller & Niro

(57) ABSTRACT

A valve having a port defining a first internal passageway and a body portion defining a second internal passageway. Also provided is a first aperture and an oppposingly located second aperture which are in communication with the second passageway. The first aperture is adapted to permit water to flow into the livewell for recirculation and the second aperture is adapted to permit water to pump out of the livewell. A diverter is position in the location where the internal passageways merge. The diverter is moveable between first and second positions. In the first position, the diverter directs water flow through the first aperture and prevents water from flowing through the second aperture to effectuate recirculation. In the second position, the diverter directs the flow of water through the second aperture and prevents water from flowing through the first aperture to effectuate pump out of the livewell.

3 Claims, 5 Drawing Sheets

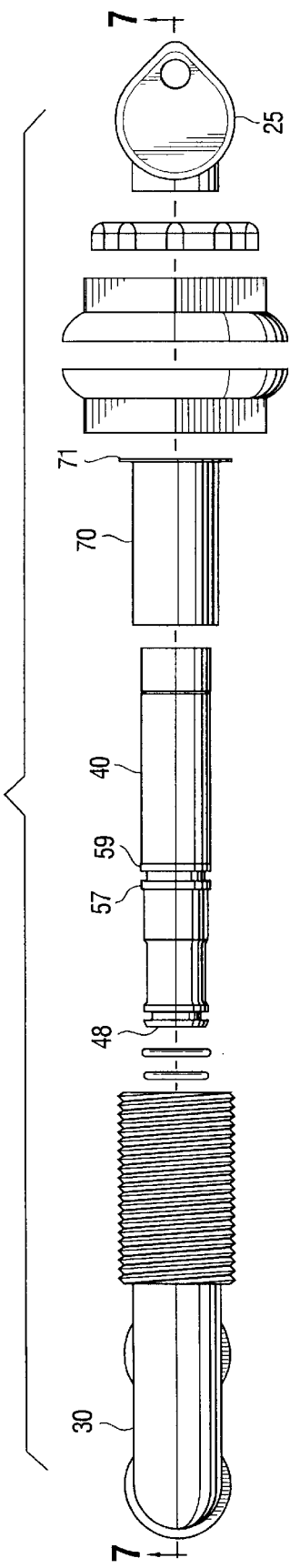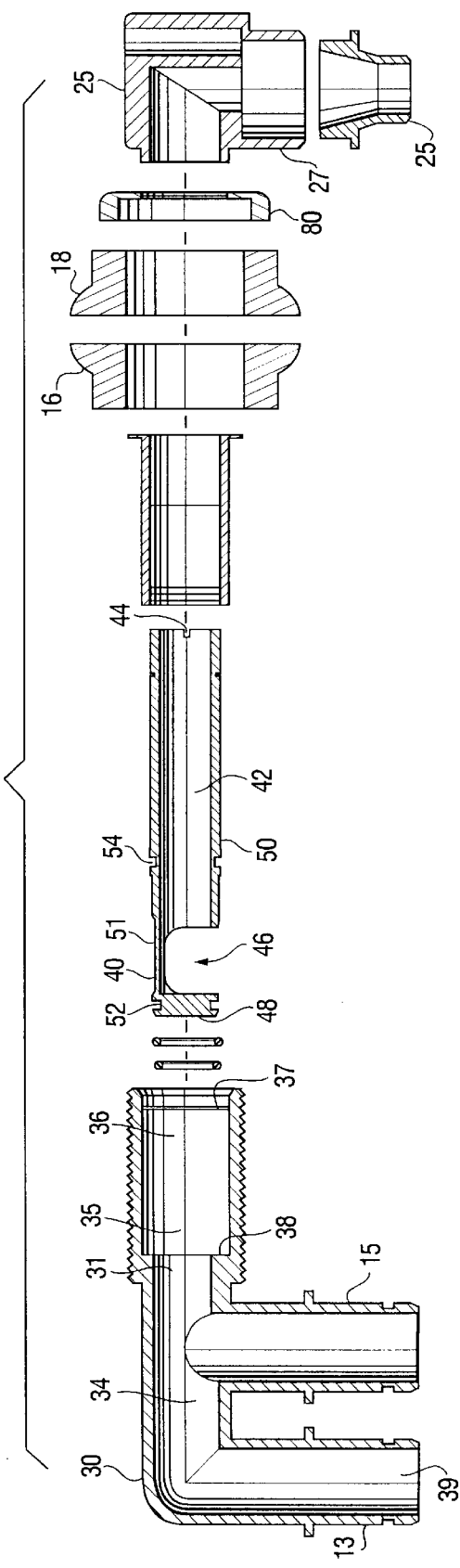

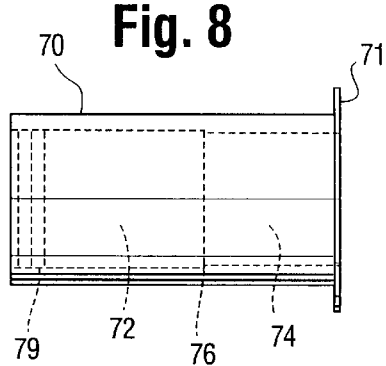
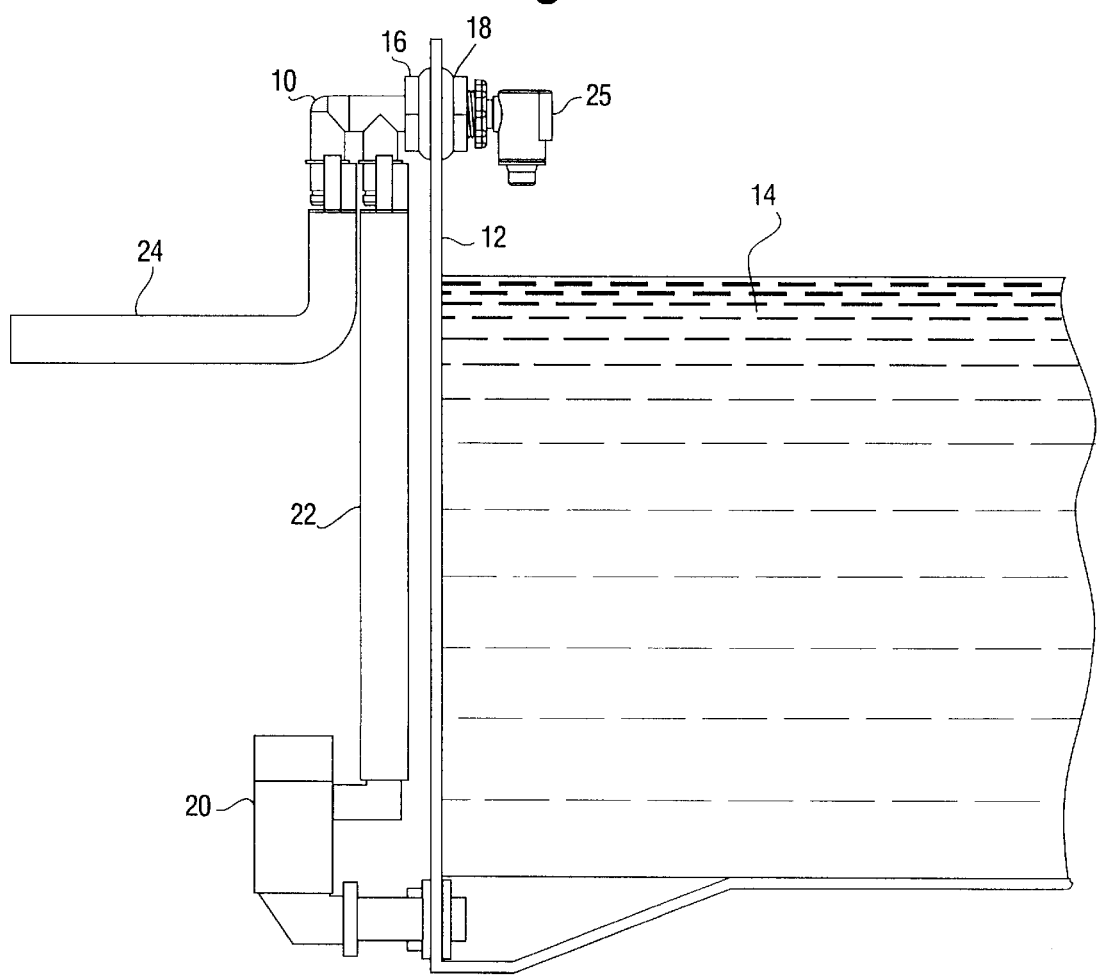

DIVERTER VALVE

BACKGROUND OF THE INVENTION

The present invention relates to valve that controls the flow of water to a livewell on a fishing boat. More specifically, the present invention concerns a novel valve that is used in connection with livewells typically found on sport fishing boats to both recirculate water to a livewell and to pump water out of the livewell when desired.

SUMMARY OF THE INVENTION

Currently, recreational fishing boat livewells typically have gravity drains and are therefore slow to empty. It is becoming common for remote control (cable operated) diverter valves to be mounted to the pump outlet so that water can either be recirculated and aerated or diverted to a drain line for rapid pump out. The problem is that valves allowing rapid pump out are relatively expensive to buy and install. Also, they are typically cable operated which adds to the expense and installation complexity. In addition, the fisherman may also desire to lower the water level in the livewell while standing nearby so that a catch may be easily removed. Thus, it would be desirable to control both recirculation and pump out right at the livewell rather than via a controller mounted remotely, as is typically done.

The ideal solution is to provide a valve that is easily accessible and operable at the livewell so that the fisherman can initiate the pump out cycle to lower the level while observing the level as it drops and then quickly return the valve to the recirculate position without leaving the livewell area. The present invention does this by providing a valve having a port defining a first internal passageway and a body portion defining a second internal passageway. Also provided is a first aperture and an opposingly located second aperture which are in communication with the second passageway. The first aperture is adapted to permit water to flow into the livewell for recirculation and the second aperture is adapted to permit water to pump out of the livewell. A diverter is position in the location where the internal passageways merge. The diverter is moveable between first and second positions. In the first position, the diverter directs water flow through the first aperture and prevents water from flowing through the second aperture to effectuate recirculation. In the second position, the diverter directs the flow of water through the second aperture and prevents water from flowing through the first aperture to effectuate pump out of the livewell.

DESCRIPTION OF THE DRAWINGS

These and other features, objects and advantages of the present invention will become apparent from the following description and drawings wherein like reference numerals represent like elements in several views, and in which:

FIG. 6 is a top exploded view of the invention.

FIG. 7 is a sectional view of the embodiment shown in FIG. 6 taken along line A—A.

FIG. 8 is a sectional view of a valve retainer which may be used with the present invention.

FIG. 9 depicts a typical installation.

DESCRIPTION OF THE PREFERRED EMBODIMENT

Set forth below is a description of what are currently believed to be the preferred embodiments or best examples of the invention claimed. Future and present alternatives and modifications to the preferred embodiments are contemplated. Any alternates or modifications in which insubstantial changes in function, in purpose, in structure or in result are intended to be covered by the claims of this patent.

Figure 1:
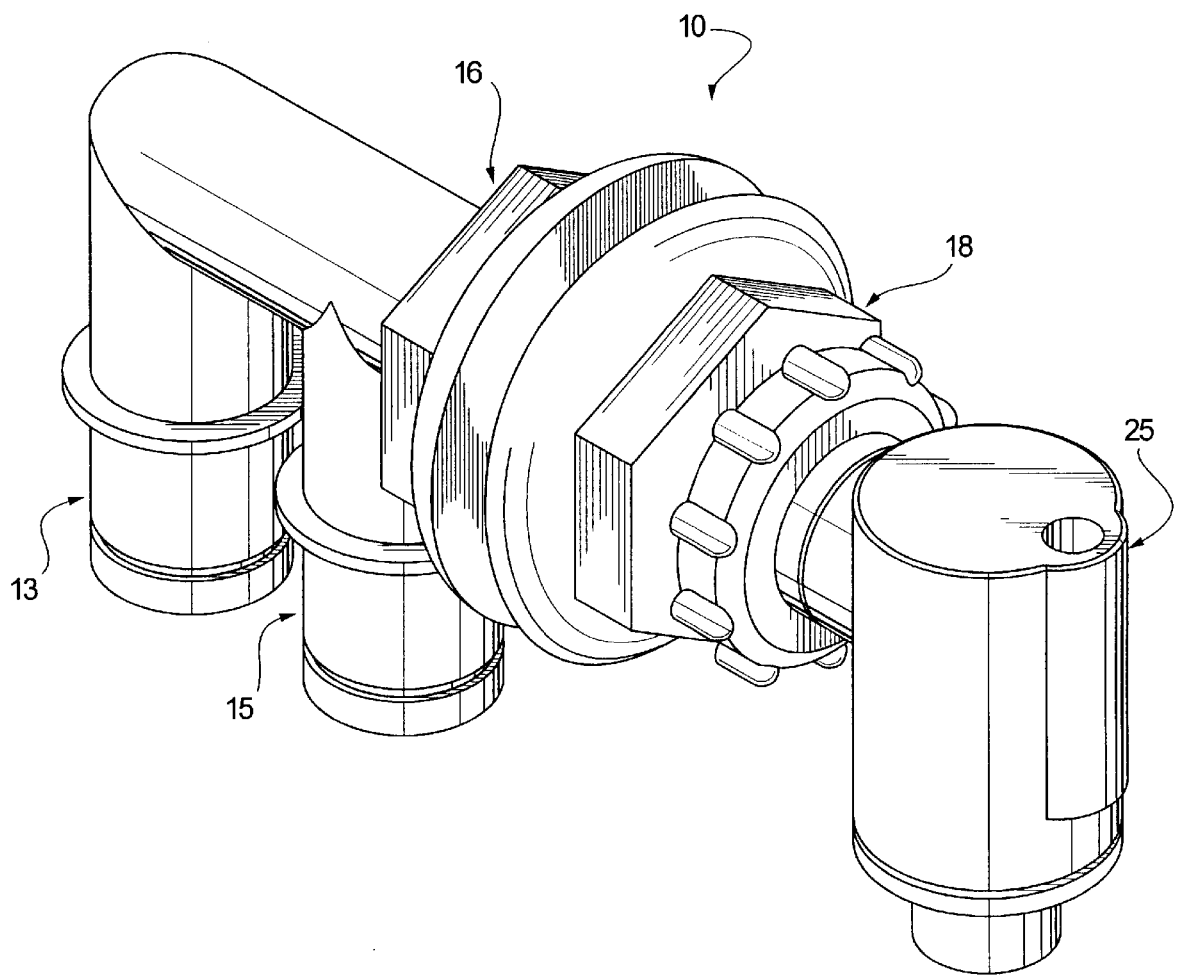
FIG. 1 is a perspective view of one embodiment of the present invention.
Figure 2:
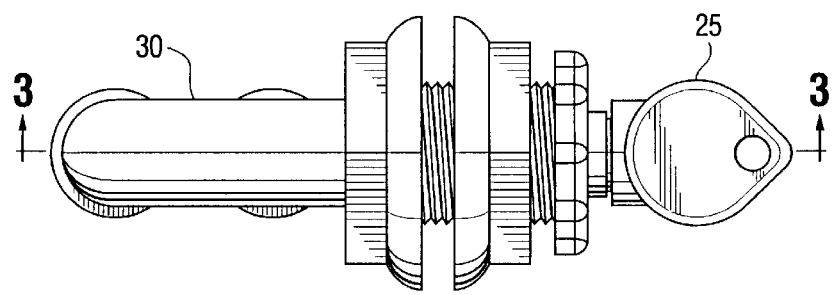
FIG. 2 is a top view of one embodiment of the present invention in a recirculate position.

As shown in FIGS. 1 and 9, the present invention concerns a valve 10 that is used to both aerate and drain or pump out a livewell on a fishing boat. Valve 10 may include a body portion 30, valve member 40, and valve retainer 70, among other things. Valve 10 may be affixed to a sidewall 12 of a livewell 14 by mounting nuts 16 and 18 which are biased against sidewall 12 which is disposed therebetween. A pump 20 is connected to valve 10 by intake pipe 22 via connector 13. Also included is pump out pipe 24 which is also connected to valve 10 via a second connector 15 defining an aperture 17. An aerator nozzle 25 having an aperture 19 may also be provided.

As shown in FIGS. 2–8, and particularly FIG. 7, valve 10 includes a body portion 30 which includes an internal chamber 31 defining an internal passageway 35 which may be further divided into a first internal passageway section 34 which is smaller in diameter or size than a second internal passageway section 36 which results in the formation of a shoulder or stop 38. Passageway 35 ultimately terminates at opposingly located apertures 17 and 19. Body 30 may also include threads 33 which compact with fasteners or nuts 16 and 18.

The valve of the present invention also includes valve member 40 having an internal passageway 42 which is in communication with an exit port 44 and intake port 46. An end wall or diverter 48 is also provided. Located on the outer wall 50 of member 40 are U-shaped O-ring seats 52 and 54 which receive O-rings 56 and 58. Also formed on outer wall 50 are stops or shoulders 57 and 59.

As shown in FIGS. 7 and 8, the valve of the present invention may also include a valve retainer 70, which includes a flange 71. A first chamber 72 and second chamber 74 may also be provided with retainer 70. As shown, first chamber 72 may be constructed to be larger in size or diameter than chamber 74 so as to form a shoulder or stop 76. As is also shown in FIG. 8, a portion of chamber 72 may be a relieved portion 79 to account for an expansion of an O-ring which seals therein.

As shown in FIGS. 2–5, when assembled, O-rings 56 and 58 are placed in seats 52 and 54. Member 40 is then placed within both body 30 and retainer 70, with diverter 48 located in body 30 and a neck portion 41 extending outwardly therefrom. Nozzle 25 may be connected to member 40 on neck 41 by threads, adhesive, or in other ways known to those of skill in the art.

As shown in FIG. 9, valve 10 is secured by first mounting nut 16 to body 30 and then inserting the valve through an appropriate opening in livewell 14. Nut 18 is then secured to body 30 which attaches valve 10 to the livewell. Next, as discussed above, member 40 is inserted into the internal passageway 35 of chamber 31 with diverter 48 located therein and positioned at a location where the internal passageways merge. Valve retainer 70 is then slipped over valve member 40. A locknut 80 is then used to secure valve member 40 and retainer 70 inside body 30 by engaging flange 71 and biasing retainer 70 inwardly by contacting with threads 33.

Figure 3:
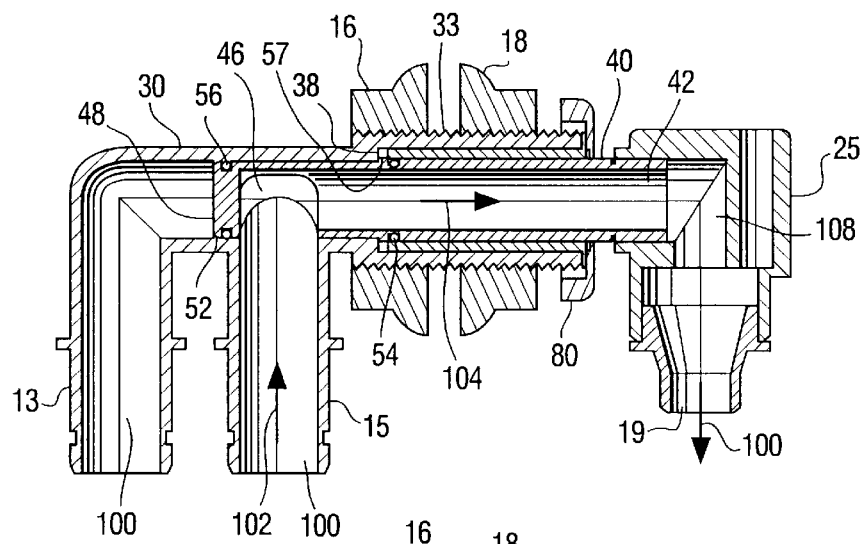
FIG. 3 is a sectional view of the embodiment shown in FIG. 2 taken along line A—A.
Figure 4:
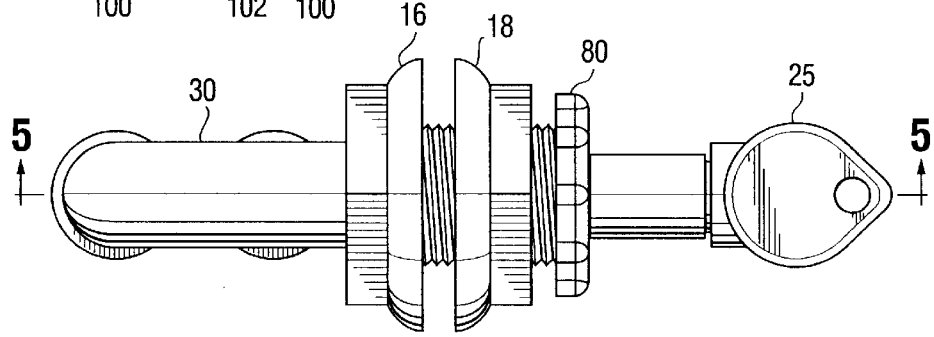
FIG. 4 is a top view of one embodiment of the present invention in a pump out position.
Figure 5:
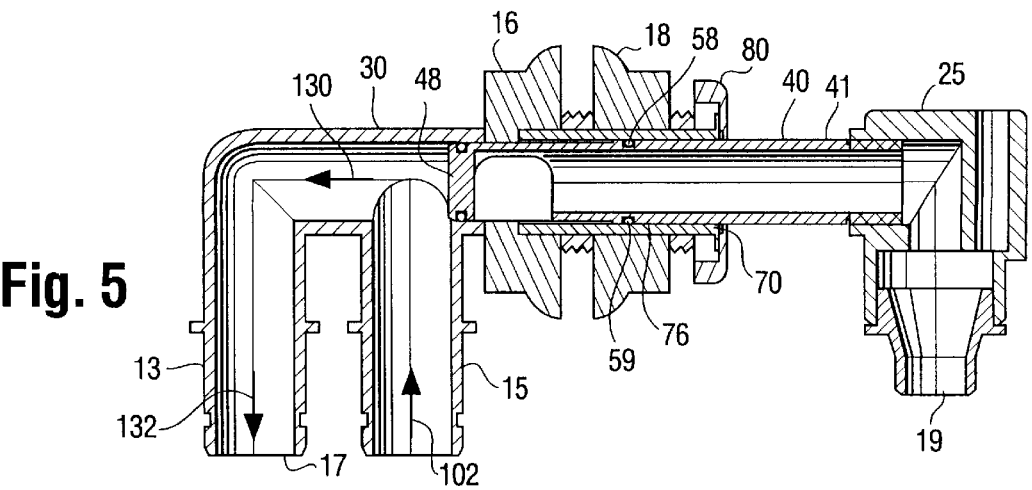
FIG. 5 is a sectional view of the embodiment shown in FIG. 4 taken along line B—B.
Figure 10:
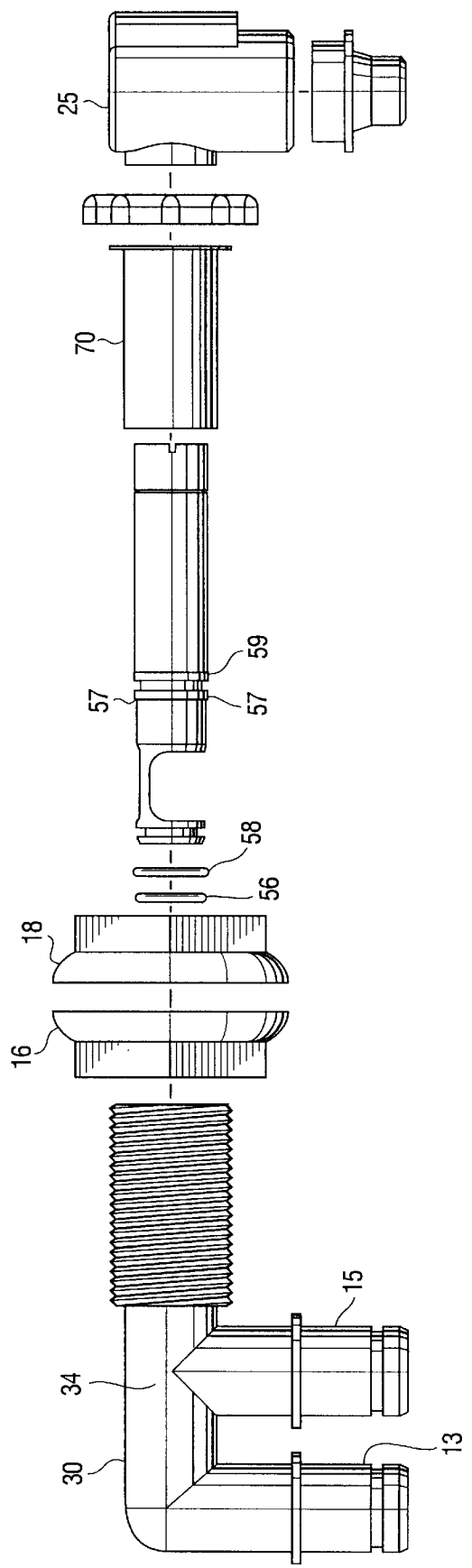
FIG. 10 is a side exploded view of the present invention.

As shown in FIGS. 3 and 5, valve member 40, and consequently, diverter 48 articulates between a first recirculate position and a second pump out position to control the level of water in the livewell. In a preferred embodiment, sections 32 and 34 of chamber 31 are circular in cross-section although other cross-sectional shapes may be used as well. Likewise, valve member 40 may be tubular in shape and the outer diameter as defined by wall 50 is sized to fit within section 36 with minimal clearance. Similarly, the outer diameter of valve member 40 at wall 51 is sized to fit within section 34 of chamber 31 with minimal clearance. This arrangement allows valve member 40 and diverter 48 to articulate within body 30 while also enabling O-rings 56 and 58 to form a seal with body 30 that prevents water leakage.

To recirculate water into livewell 14, nozzle 25 is pressed inwardly until stop or shoulder 57 on valve member 40 engages and abuts stop or shoulder 38 on body 30. This engagement prevents further axial movement of the diverter and also aligns intake port 46 with passageway 100 of port or connector 15. This creates a flow path depicted by arrows 102, 104, and 106 as shown in FIG. 3. More specifically, water from pump 20 flows through pipe 22 and into member 40 via port 46 as shown by arrow 104. From there, the flow path created results in water flowing through the passageway and to nozzle 25 where it exits through aperture 19 as shown by arrow 106. As is also shown, O-ring 56 and end wall or diverter 48 prevent water from entering into the portion of the valve defined by chamber 31 which is in communication with passageway portion 120 defined by connector 13.

To pump water out of the livewell, nozzle 25 acts as a handle and is pulled outwardly until stop or shoulder 59 engages or abuts stop or shoulder 76 which prevents any further axial movement. As shown in FIG. 5, once in this position, end wall or diverter 48 and O-ring 56 prevent water from entering the passageway portion of the valve which supplies water to the nozzle for recirculation. Instead, as shown by arrows 102, 130, and 132, water flows through chamber 31 and into passageway portion 120 of valve 10 defined by port or connector 13, and eventually, into pipe 24 via aperture 17 which discharges the water from the livewell.

Thus, articulating member 40 and diverter 48 axially allows for the user to selectively control the output of pump 20. When in a first recirculate position, the water flow path created in the internal passageway of the valve is used to aerate the livewell by preventing water from flowing to the portion of the passageway which is in communication with the drain system. Then, with an axial movement of about ¾ inch, the diverter is placed into a second position where the water flow path created in the passageway is used to pump out the livewell through the drain system while preventing water from flowing into the passageway section which is in communication with the nozzle.

While the preferred embodiments of the present invention have been illustrated and described, it will be understood by those of ordinary skill in the art that changes and other modifications can be made without departing from the invention in its broader aspects. Various features of the present invention are set forth in the following claims.

What is claimed is:

1. A valve for use in connection with a livewell on a fishing boat comprising:
    a body having an input port in communication with a first internal passageway and
    a second internal passageway having a first aperture and opposingly located second aperture;
    said first aperture adapted to permit a water flow path into the livewell;
    said second aperture adapted to permit a water flow path to pump out the livewell;
    said first internal passageway in communication with said second internal passageway;
    a diverter located in said body, said diverter moveable between first and second positions;
    in said first position, said diverter directs the flow of water through said first aperture and prevents water from flowing through said second aperture; and
    in said second position, said diverter directs the flow of water through said second aperture and prevents water from flowing through said first aperture.

2. A valve for use in connection with a livewell on a fishing boat comprising:
    a body having an input port in communication with a first internal passageway and
    a second internal passageway having a first aperture and opposingly located second aperture;
    said first aperture adapted to permit a water flow path into the livewell;
    said second aperture adapted to permit a water flow path to pump out the livewell;
    said first internal passageway in communication with said second internal passageway;
    a diverter located in said body in communication with a nozzle, said nozzle acts as a handle to position said diverter between first and second positions;
    in said first position, said diverter directs the flow of water through said first aperture and prevents water from flowing through said second aperture; and
    in said second position, said diverter directs the flow of water through said second aperture and prevents water from flowing through said first aperture.

3. A valve for use in connection with a livewell on a fishing boat comprising:
    a body mountable to said livewell having an input port in communication with a first internal passageway and
    a second internal passageway having a first aperture and opposingly located second aperture;
    said first aperture adapted to permit a water flow path into the livewell;
    said second aperture adapted to permit a water flow path to pump out the livewell;
    said first internal passageway in communication with said second internal passageway;
    a diverter located in said body, said diverter moveable between first and second positions;
    in said first position, said diverter directs the flow of water through said first aperture and prevents water from flowing through said second aperture; and
    in said second position, said diverter directs the flow of water through said second aperture and prevents water from flowing through said first aperture.

* * * * *